United States Patent
Abughalieh et al.

(10) Patent No.: US 10,505,768 B2
(45) Date of Patent: Dec. 10, 2019

(54) PARTIALLY DISJOINT EQUALIZATION AND CARRIER RECOVERY

(71) Applicants: Nash'at Abughalieh, Kanata (CA); Syed Faisal Ali Shah, Cary, NC (US); Chuandong Li, Ottawa (CA)

(72) Inventors: Nash'at Abughalieh, Kanata (CA); Syed Faisal Ali Shah, Cary, NC (US); Chuandong Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/838,499

(22) Filed: Dec. 12, 2017

(65) Prior Publication Data
US 2019/0182082 A1 Jun. 13, 2019

(51) Int. Cl.
*H04L 25/03* (2006.01)
*H04B 10/61* (2013.01)

(52) U.S. Cl.
CPC ..... *H04L 25/03273* (2013.01); *H04B 10/612* (2013.01); *H04L 25/03019* (2013.01); *H04L 25/03267* (2013.01); *H04L 25/03885* (2013.01); *H04L 2025/03636* (2013.01); *H04L 2201/02* (2013.01)

(58) Field of Classification Search
CPC ......... H04L 25/03273; H04L 25/03885; H04L 25/03267; H04L 2201/02; H04B 10/612
See application file for complete search history.

(56) References Cited

U.S. PATENT DOCUMENTS

| | | | | |
|---|---|---|---|---|
| 5,940,450 A | * | 8/1999 | Koslov | H04L 27/3827 375/326 |
| 7,606,498 B1 | * | 10/2009 | Wu | H04B 10/60 398/152 |
| 9,231,787 B1 | * | 1/2016 | Zamani | H04L 27/0014 |
| 2005/0157820 A1 | * | 7/2005 | Wongwirawat | H04L 25/0307 375/326 |
| 2005/0286625 A1 | | 12/2005 | Jung | |
| 2006/0189295 A1 | | 8/2006 | Adachi | |

(Continued)

FOREIGN PATENT DOCUMENTS

| CN | 1716931 A | 1/2006 |
|---|---|---|
| CN | 101345830 A | 1/2009 |

(Continued)

*Primary Examiner* — Kenneth T Lam

(57) ABSTRACT

An apparatus in a signal receiver, such as an optical signal receiver, is provided. An adaptive equalizer provides an equalized output indicative of a received signal. A feedback component receives the equalized output and provides feedback to the adaptive equalizer. A carrier recovery component receives the equalized output from the adaptive equalizer provides estimates of symbols. The carrier recovery component is partially or fully disjoint from the feedback component, thus removing the carrier recovery component from equalizer the feedback loop. The feedback component can include an initial carrier recovery component and a phase rotation and detection component. The initial carrier recovery component generates a carrier recovery output based on the equalized output. The phase rotation and detection component performs a phase rotation based on the carrier recovery output.

19 Claims, 15 Drawing Sheets

(56) References Cited

U.S. PATENT DOCUMENTS

| | | | |
|---|---|---|---|
| 2011/0103529 A1* | 5/2011 | Kim | H04B 10/60 375/344 |
| 2012/0033965 A1* | 2/2012 | Zhang | H04B 10/611 398/38 |
| 2012/0236926 A1 | 9/2012 | Bourdoux et al. | |
| 2014/0086350 A1* | 3/2014 | Wolfgang | H04L 27/0014 375/260 |
| 2015/0188641 A1* | 7/2015 | Awadalla | H04B 10/612 398/202 |
| 2015/0270921 A1 | 9/2015 | Jia et al. | |

FOREIGN PATENT DOCUMENTS

| | | |
|---|---|---|
| CN | 102821073 A | 12/2012 |
| CN | 104935385 A | 9/2015 |

* cited by examiner

PARTIALLY DISJOINT EQUALIZATION AND CARRIER RECOVERY

FIELD OF THE INVENTION

The present application pertains to the field of communication signal reception and processing. More particularly, the present application relates to a method and apparatus for performing channel equalization and carrier recovery in a signal receiver such as a coherent optical receiver.

BACKGROUND

The increase in bandwidth demand for optical links, such as the links found in long haul optical networks, can be satisfied by increasing the capacity of optical link. Increasing the baud rate is among the methods that can be used to increase the capacity of the optical links. Increasing the baud rate requires an increase in the clocking speed of the Digital Signal Processing (DSP) chip, except if the data samples are processed in bigger block sizes (parallelizing the data path). There is also demand for energy consumption reduction in the DSP chip, which may be obtained by reducing clock speed and increasing DSP processor block size. The drawback of increasing the DSP processor block size is the discontinuity in the adaptation of the DSP loops. It can be challenging to retain the performance of the DSP algorithms while reducing the loops update rate.

Coherent optical receivers typically use adaptive equalizers to compensate for time-varying polarization, mode dispersion effects, and inter-symbol interference (ISI). Performance of coherent optical receivers often relies heavily on carrier recovery (CR) methods. The interplay between adaptive equalization and CR has led to two types of coherent receiver architectures: blind equalization with independent CR; and joint equalization and CR.

For blind equalization with independent CR, the adaptive equalizer can use a constant modulus algorithm (CMA) for equalizer convergence. In this case the equalizer is decoupled from the carrier recovery and potentially has low complexity. However, the CMA typically exhibits a slow convergence rate, and this scheme can be sensitive to higher order modulations, such as 16QAM or higher.

For joint equalization and CR, the equalizer can be adapted in a decision directed (DD) manner, for example using a Least Mean Squares (LMS) algorithm. This approach exhibits faster convergence and better performance than blind equalizers. However, for implementation, the equalizer typically requires full knowledge of signal phase offsets to update its filter coefficients. Furthermore, due to its limited speed, the presence of the CR operation the adaptive equalizer feedback loop limits the speed of equalizer adaptation.

Therefore there is a need for an adaptive equalizer in a signal receiver, for example in an optical modem, that is not subject to one or more limitations of the prior art, such as decreasing performance with increasing data block size.

This background information is provided to reveal information believed by the applicant to be of possible relevance to the present invention. No admission is necessarily intended, nor should be construed, that any of the preceding information constitutes prior art against the present invention.

SUMMARY

An object of the present invention is to provide a method and apparatus for performing channel equalization and carrier recovery in a signal receiver such as a coherent optical receiver. The signal receiver can be one which employs parallelized processing of received data by processing a sequence of blocks, each block containing multiple received symbols which are processed concurrently. In accordance with an aspect of the present invention, two operations, namely adaptive channel equalization and carrier recovery, are performed in a partially disjoint manner. The adaptive channel equalization employs a feedback loop which involves a phase rotation and detection operation. The phase rotation and detection operation relies on output of an initial phase offset estimation operation which run on the filter output and gives rough phase offset estimate that is used, together with the frequency offset that can be estimated from the adaptive filter output or calculated in the carrier recovery from previous filter outputs, as input information to perform phase rotation on the adaptive filter output to correct partially phase and frequency offset, prior to symbol detection in the detection operation. The initial phase offset estimation operation can be part of what is referred to herein as an initial carrier recovery operation or component. The initial carrier recovery operation (and associated initial phase and/or frequency offset correction) is performed separately from a final (or fine), more fully functional carrier recovery operation, which results in the disjoint nature of the two operations. However, in some embodiments, data generated by the initial carrier recovery operation may be passed to and used by the fine carrier recovery operation (also sometimes referred to as final carrier recovery), data generated by the fine carrier recovery operation is passed to and used by the initial carrier recovery operation, or both. The data may include carrier phase estimates, carrier frequency estimates, or both. Alternatively the data may include adaptive filter output after being subjected to an initial phase rotation, this data being passed to the fine carrier recovery operation. This sharing of data results in the partial disjointness (rather than full disjointness) of the adaptive equalization and carrier recovery operations.

In a related aspect of the present invention, and adaptive channel equalization method and apparatus is provided which employs a feedback loop, the feedback loop involving a phase rotation and detection operation. The phase rotation and detection operation relies on output of an initial carrier recovery operation. The initial carrier recovery operation is operatively coupled with a separate, fine carrier recovery operation. In some embodiments, the initial carrier recovery operation provides estimates (e.g. phase estimates) to the fine carrier recovery operation. In some embodiments, the fine carrier recovery operation provides estimates (e.g. carrier frequency estimates) to the initial carrier recovery operation. In some embodiments, the initial carrier recovery operation provides adaptive filter output, after being subjected to an initial phase rotation, to the fine carrier recovery operation.

In accordance with an embodiment of the present invention, there is provided an apparatus in a signal receiver. The apparatus includes an adaptive equalizer configured to receive input indicative of a received signal and to provide an equalized output indicative of a corrected version of the received signal. The apparatus further includes a feedback component configured to receive the equalized output from the adaptive equalizer and provide feedback to the adaptive equalizer based on the equalized output. The apparatus further includes a fine carrier recovery component configured to directly or indirectly receive the equalized output from the adaptive equalizer and to provide estimates of symbols carried in the received signal based on the equalized output, wherein the fine carrier recovery component is partially or fully disjoint from the feedback component.

In accordance with another embodiment of the present invention, there is provided an apparatus in a signal receiver for providing feedback to an adaptive equalizer of the signal receiver. The apparatus includes an initial carrier recovery component configured to generate a carrier recovery output based on equalized output received from the adaptive equalizer and an estimate of frequency components of the received signal. The apparatus further includes a phase rotation and detection component configured to receive the equalized output from the adaptive equalizer and to detect symbols carried in the received signal based on the equalized output following a phase rotation performed on the equalized output, the phase rotation performed based on the carrier recovery output generated by the initial carrier recovery component, the detected symbols fed back directly or indirectly to the adaptive equalizer.

In accordance with another embodiment of the present invention, there is provided a method for operating a signal receiver. The method includes providing, by an adaptive equalizer, an equalized output indicative of a corrected version of a received signal. The method further includes receiving, by a feedback component, the equalized output from the adaptive equalizer. The method further includes providing, by the feedback component, feedback to the adaptive equalizer based on the equalized output. The method further includes directly or indirectly receiving, by a fine carrier recovery component separate from the feedback component, the equalized output from the adaptive equalizer. The method further includes providing, by the fine carrier recovery component, estimates of symbols carried in the received signal based on the equalized output.

In accordance with another embodiment of the present invention, there is provided a method for operating a signal receiver. The method includes, by an initial carrier recovery component, generating a carrier recovery output based on: equalized output received from an adaptive equalizer of the signal receiver, and an estimate of frequency components of the received signal. The method further includes, by a phase rotation and detection component: receiving the equalized output from the adaptive equalizer; performing a phase rotation on the equalized output, based on the carrier recovery output generated by the initial carrier recovery component; detecting symbols carried in the received signal based on the equalized output following the phase rotation; and feeding back the detected symbols directly or indirectly to the adaptive equalizer.

BRIEF DESCRIPTION OF THE DRAWINGS

Further features and advantages of the present invention will become apparent from the following detailed description, taken in combination with the appended drawing, in which.

DETAILED DESCRIPTION

Figure 1:
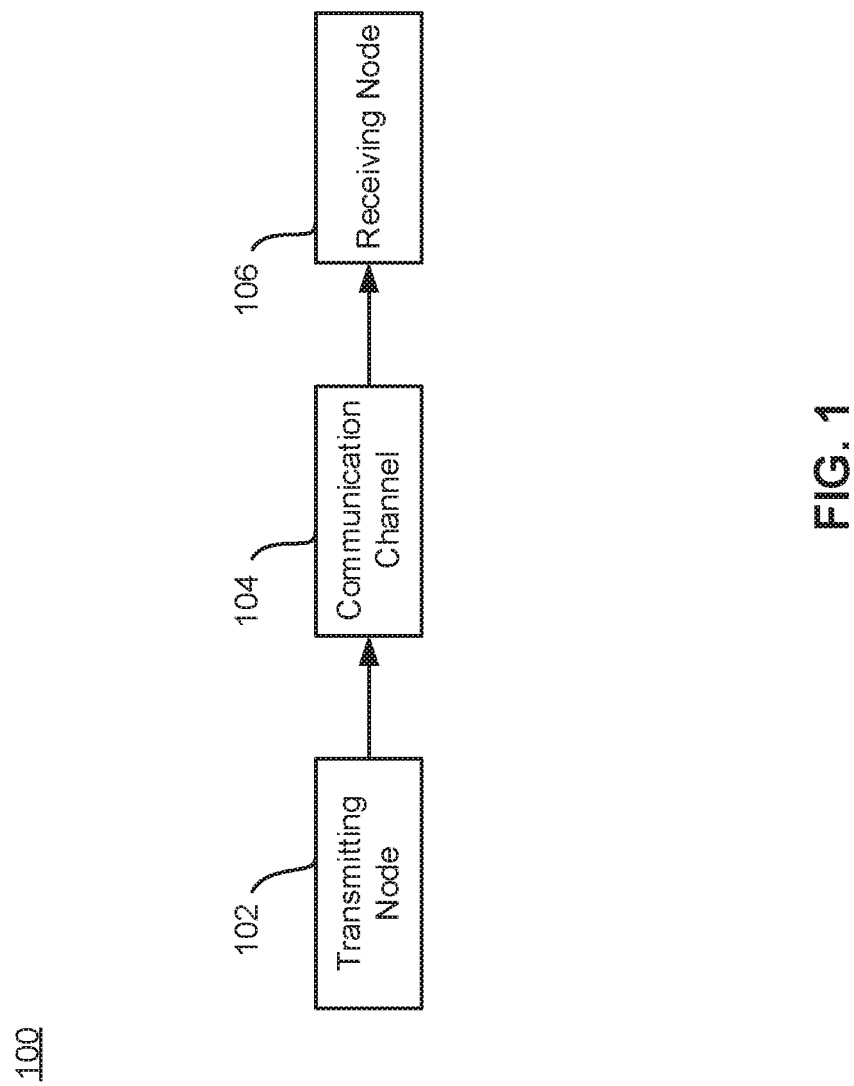
FIG. 1 is a simplified schematic diagram of an embodiment of a communication system where embodiments of the present disclosure may operate.

Disclosed herein are at least one method, apparatus, and/or system implementing partially disjoint decision directed adaptive channel equalization and carrier recovery. A receiver in a communication system comprises an adaptive equalizer and a feedback component. In various embodiments, the adaptive equalizer includes an adaptive filter (such as a Finite Impulse Response (FIR) filter), signal error calculator, and a coefficient update calculator. In various embodiments, the feedback component includes an initial carrier recovery component and a phase rotation and detection component. The initial carrier recovery component may include an initial phase estimator, a ramp generator (also referred to as a phase ramp calculator), and/or a numerically controlled oscillator. The phase rotation and detection component may include one or more phase rotators and one or more detectors. The above-mentioned components each process multiple data inputs in parallel or serially. In practice, various components and sub-components are provided as electronic circuits, the definitions and boundaries of which may not necessarily be clear and distinct. Thus, the arrangement, naming and categorization of components as described herein is used for purposes of clarity and is not necessarily intended to be limiting.

The receiver may include an analog-to-digital converter (ADC) providing samples in parallel, or the ADC may provide serial samples which are converted to blocks of parallel samples. Receiving and processing samples in parallel may enable the receiver to operate at higher data rates. The parallel samples may be processed using the adaptive filter (e.g. the adaptive channel equalization filter of the adaptive equalizer) first, then converted to symbols, or the samples may be converted to symbols first then equalized. In either case, the output of the adaptive filter is assumed to be blocks of symbols. These blocks of symbols may at least intermittently contain a transmitted training sequence. This training sequence may be used by the initial carrier recovery component to estimate initial phase offsets. The initial phase offsets, estimated for example using the training sequence, can in turn be used to partially correct phase offsets of adaptive filter outputs until the next training sequence is received. A detector (e.g. within the phase rotation and detection component) is used to detect originally transmitted symbols by analysis of the partially phase and frequency corrected adaptive filter output. Output of the detector can be de-rotated in phase and the result may be used with the filter output to estimate the error in the filter output. The coefficient update calculator may use the estimated error to update the adaptive filter's coefficients, so that the adaptive filter processes subsequently received data using filter coefficients provided by the coefficient update calculator. Carrier recovery components, such as a fine carrier recovery component, may use the initial phase and frequency estimates, along with the adaptive filter output, to fine track the phase offset in the symbols and correct it, separately from the adaptive equalizer's feedback loop.

Optical receivers rely on parallel processing to achieve high throughput requirements, for example on the order of 100 Gbps. The demand for higher throughput is pushing technology towards the use of higher order QAM modulation and high performance receivers that require sophisticated equalization and CR algorithms. In general, coherent optical receivers are more sensitive to phase noise changes with time than to ISI changes with time. It is observed herein that the equalizer can process larger blocks of data before it needs to update the coefficients, while the CR operation has to process data in smaller blocks to keep track of phase changes. While block equalizers can reduce system complexity through frequency domain implementations, the presence of the CR operation in the feedback loop limits the equalizer's adaptation speed and continuity.

According to embodiments of the present invention, therefore, carrier recovery operations are separated into two stages. In the first stage, referred to as initial carrier recovery, initial phase estimation and phase ramp calculations are performed in order to provide a relatively coarse initial phase estimate which is used for adaptive equalization. The initial phase estimate can be obtained through a variety of methods, for example using training sequences. The phase ramp calculation can be performed based on a prior frequency estimate. The prior frequency estimate can be generated based on a previously received and processed data block. In the second stage, referred to as fine carrier recovery, finer-grained carrier recovery is performed using a feedback or feedforward architecture. The results of the initial carrier recovery stage are used to provide primary feedback to the adaptive equalizer, while the results of the fine carrier recovery stage are passed to a decoder but not necessarily used to provide feedback to the adaptive equalizer. That is, the fine carrier recovery stage can be decoupled from the adaptive equalizer feedback loop, while maintaining the use of decision directed equalization. However, in some embodiments output from the fine carrier recovery stage can still be used in the adaptive feedback equalizer loop, for example in a slower feedback loop operating in tandem with the primary feedback loop.

Because the initial carrier recovery operation exhibits lower delay than the fine carrier recovery operation, decision directed adaptive equalization can be implemented with lower feedback loop delay than would be possible if only the fine carrier recovery were included in the back loop. It has been observed through simulation that the benefits gained from this reduced feedback loop delay can outweigh the drawbacks due to reduced quality of output from the initial carrier recovery stage (relative to the fine carrier recovery stage). As such, in embodiments of the present invention, performing partially disjoint equalization and carrier recovery potentially results in improved performance over prior art fully joint equalization and carrier recovery implementations. It is currently believed that this is due at least in part to reduced delays in the adaptive equalization feedback loop, especially for block-based transform domain adaptive equalization implementations.

In comparison to fully blind equalization, the initial carrier recovery operation obtains at least a coarse estimate of phase errors. This allows for a form of decision directed adaptive equalization that typically exhibits improved performance over fully blind equalization.

It is noted that the adaptive equalizer itself can potentially operate in substantially the same manner as prior art adaptive equalizers, except that output samples are phase rotated using phase estimates from the initial carrier recovery stage only.

FIG. 1 is a schematic diagram of a communication system 100 with respect to which embodiments of the present disclosure may operate. The communication system 100 may be any communication system that includes, but is not limited to, optical networks, wired networks and/or wireless networks. The communication system 100 may comprise a transmitting node 102, a communication channel 104, and a receiver 106.

Figure 2:
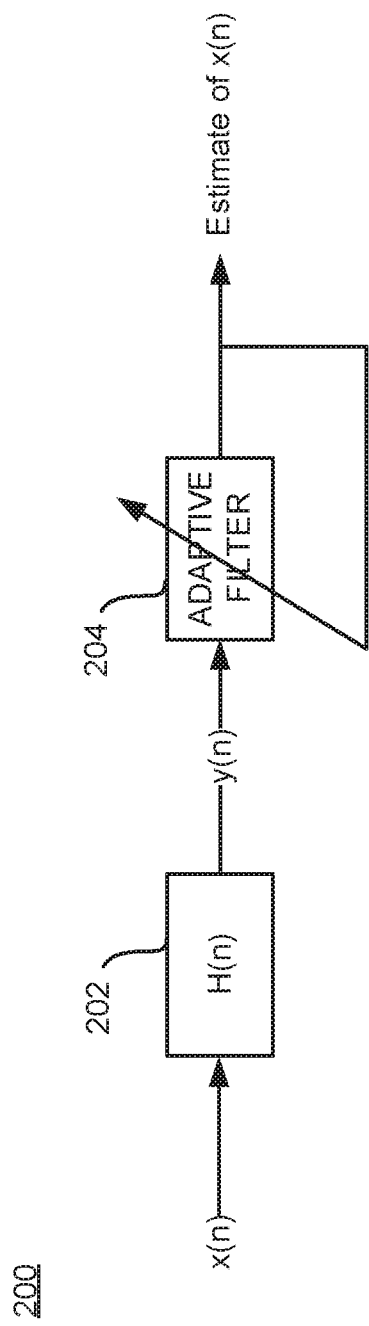
FIG. 2 is a simplified schematic diagram of an adaptive filter.

FIG. 2 is a schematic view of a system 200 comprising a communication channel 202 with the transfer function H(n) and an adaptive filter 204. The channel outputs y(n), which is generated by applying the transfer function H(n) to the input (transmitted signal) x(n). The adaptive filter 204 provides an estimate of the transmitted signal x(n) by inverting the linear operation H(n) applied by the channel 202. The estimate of x(n) is also used to tune in the adaptive filter 204.

The adaptive filter can be used to perform different functions, including but not limited to: samples interpolation, interference cancelation and/or equalization.

The adaptive filter 204 can be realized using an FIR filter which convolves the input sequence y(n) with the adaptive filter coefficients w(n). The output of the adaptive filter can be the estimate $\hat{x}(n)=\Sigma_{m=0}^{L} y(m) \cdot w(n-m)$ where L is the length of the adaptive filter. The filter operation can be performed in the frequency domain by transforming the input signal to the frequency domain and multiplying the input signal by the frequency domain version of the filter coefficients, then transforming the result back to time domain.

Figure 3:
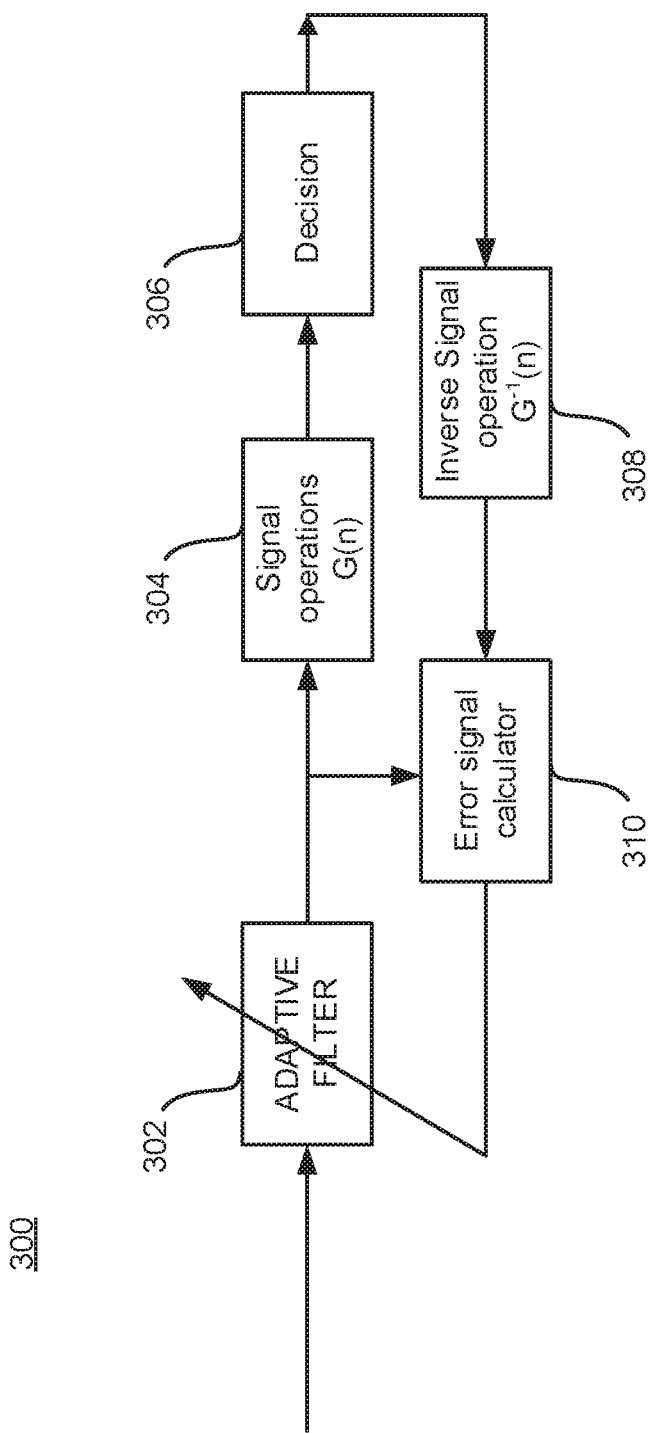
FIG. 3 is a simplified schematic diagram of a decision directed (DD) adaptive filter.

The filter coefficients can be adapted based on the adaptive filter output alone. This is referred to as blind adaptation. Alternatively the filter coefficients can be adapted using the error in the output of the adaptive filter compared with estimates of the transmitted symbols. This is referred to as decision directed adaptation. FIG. 3 illustrates a high-level representation of a decision directed adaptive filter 300.

In the decision directed adaptive filter 300 of FIG. 3, the adaptive filter coefficients are updated using a function of the error between the output of a primary adaptive filter 302 and the estimate of the transmitted data. The output of the primary adaptive filter 302 may pass through linear processing blocks 304 which perform signal operations represented by G(n). The signal operations may include phase and/or frequency offset corrections. After the linear processing, the symbols may be provided to a decision device 306 that estimates transmitted symbols. The decision device may be implemented as a symbol detector. Another processing block 308, which performs operations $G^{-1}(n)$ which are the inverse of those applied by the linear processing block 304, may receive and process the output of the decision device 306. The output of this processing block 308 is then provided to an error signal calculator block 310, which determines and provides an error signal for use in adjusting the primary adaptive filter 302.

Figure 4:
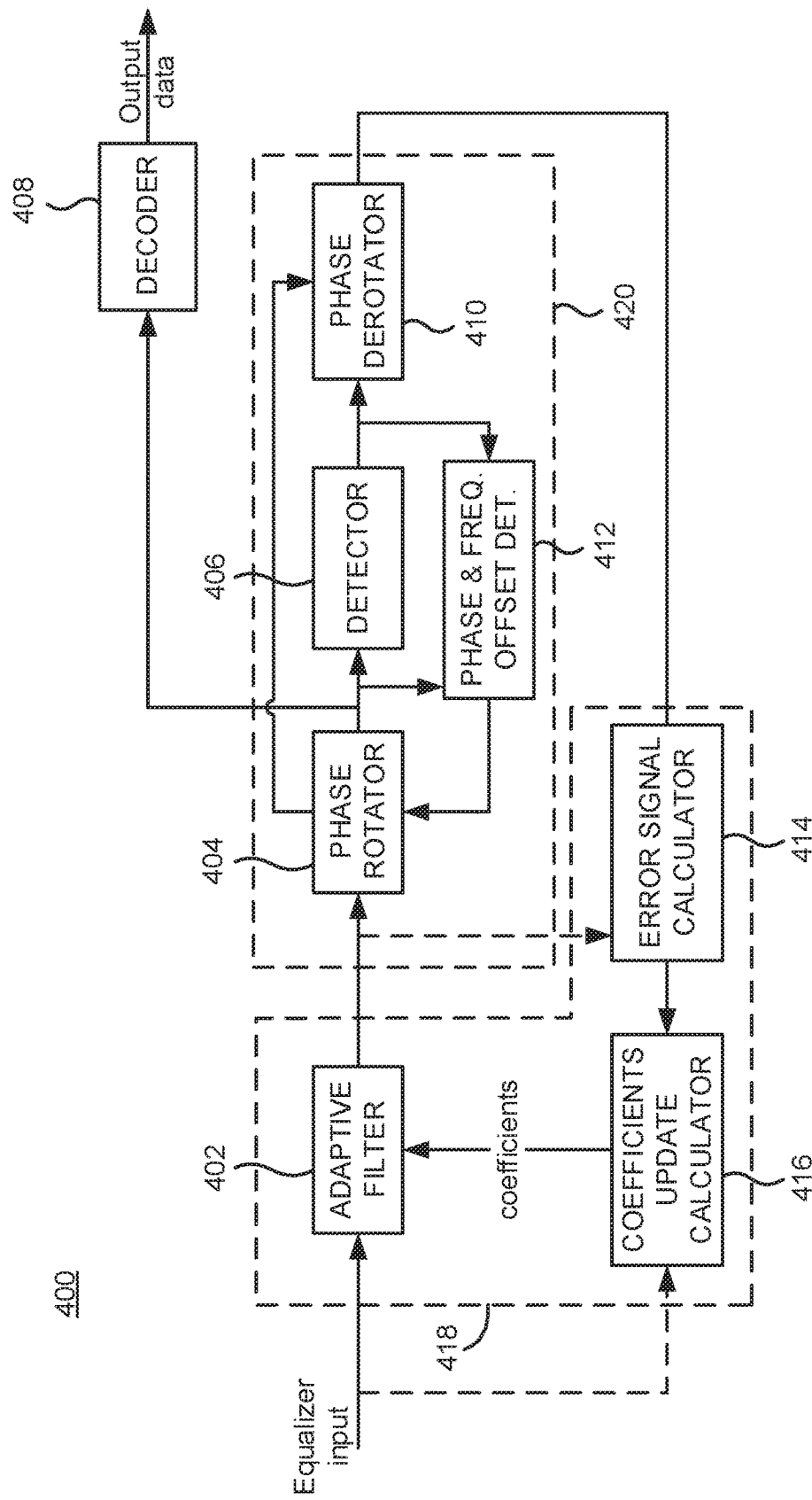
FIG. 4 is a simplified schematic diagram of an embodiment of a decision directed (DD) adaptive filter/equalizer of the prior art, including an adaptive filter and a carrier recovery component of the prior art.

FIG. 4 illustrates a decision directed adaptive equalizer 400, according to the prior art. The output of an adaptive filter 402 of an adaptive equalizer component 418 may be passed through a fully functioning carrier recovery component 420. An error signal calculator 414 (also referred to as an error signal generator) then generates an error signal based on output of the carrier recovery component 420 and/or output of the adaptive filter 402. The filter coefficients are updated, by the coefficient update calculator 416, based on a function of the generated error signal and/or the filter input. Although subsequent figures do not explicitly show all inputs to the error signal calculator and coefficient update calculator, it should be understood that the error signal calculator and coefficient update calculator provided according to embodiments of the present invention operate similarly, and are based on similar information. The carrier recovery component 420 also provides output to a decoder 408 which decodes the corrected symbols from the carrier recovery component and provides output data.

The carrier recovery component 420 operates as follows. The phase rotator 404 may correct phase offset of the adaptive filter output symbols with the phase offset estimated from the previous symbols. The detector 406 may detect the transmitted symbols. A phase and frequency offset detector 412 may use the error between inputs and outputs of the detector to estimate phase and frequency offset. A phase de-rotator 410 may reverse the phase rotator operation to facilitate calculation, by the error signal calculator 414, of the error in adaptive filter output. The carrier recovery component 420 may run different algorithms to correct phase and frequency offsets. The carrier recovery component 420 as illustrated shows one of the different techniques for correcting phase and frequency offset.

Figure 5:
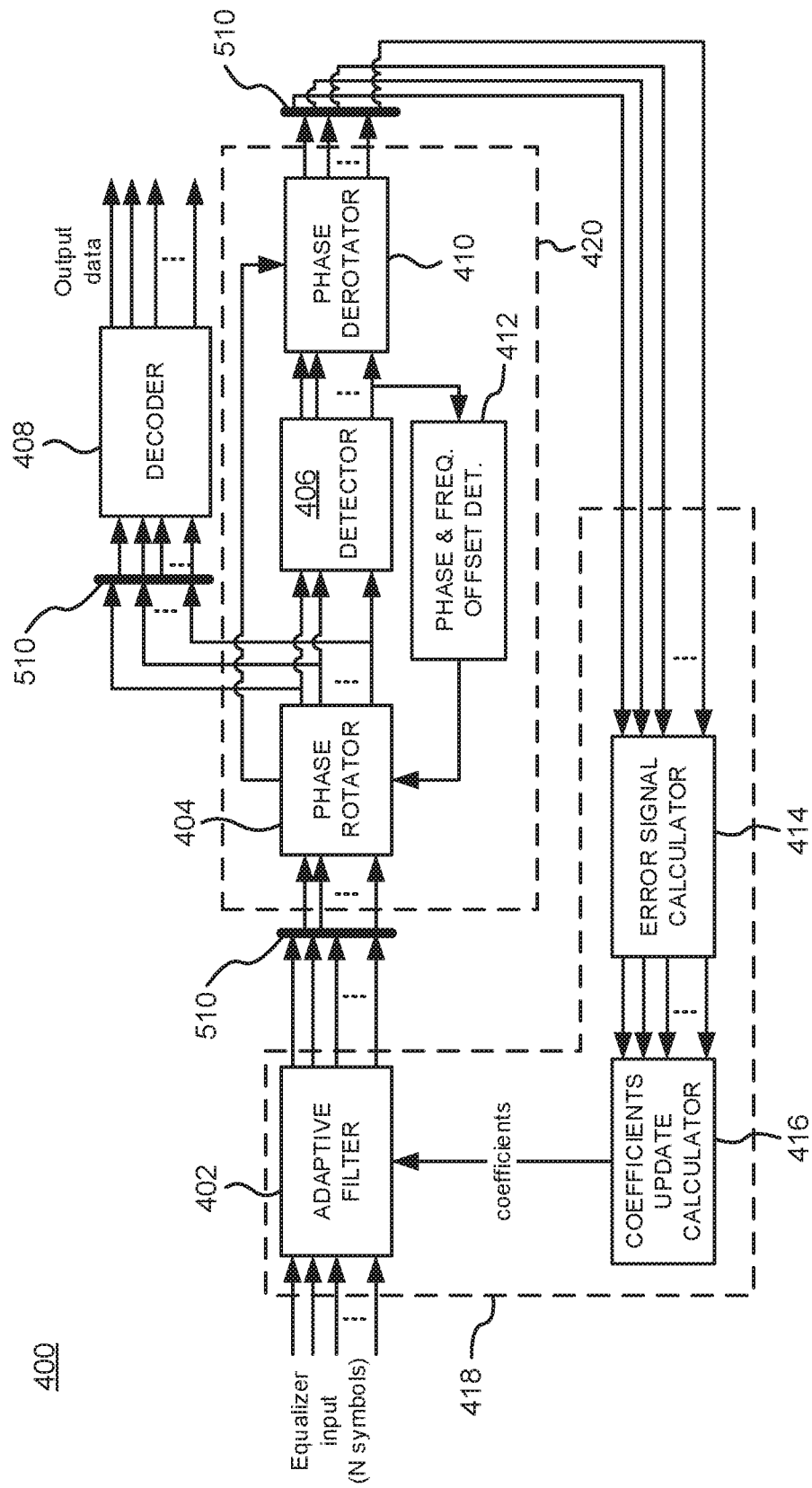
FIG. 5 is a schematic diagram of an embodiment of FIG. 4, showing parallel data processing, according to the prior art.

FIG. 5 illustrates an implementation for the apparatus in FIG. 4, according to the prior art. Notably, the carrier recovery component 420 operates on fewer bits at a time (M bits) than the adaptive equalizer or decoder (N>M bits). Converters 510, such as partial serializers/deserializers or block size converters are provided at the inputs and outputs of the carrier recovery component 420 to facilitate this. However, as discussed above, the presence of the carrier recovery in the feedback loop can be limiting to the adaptive equalizer operation.

Figure 6:
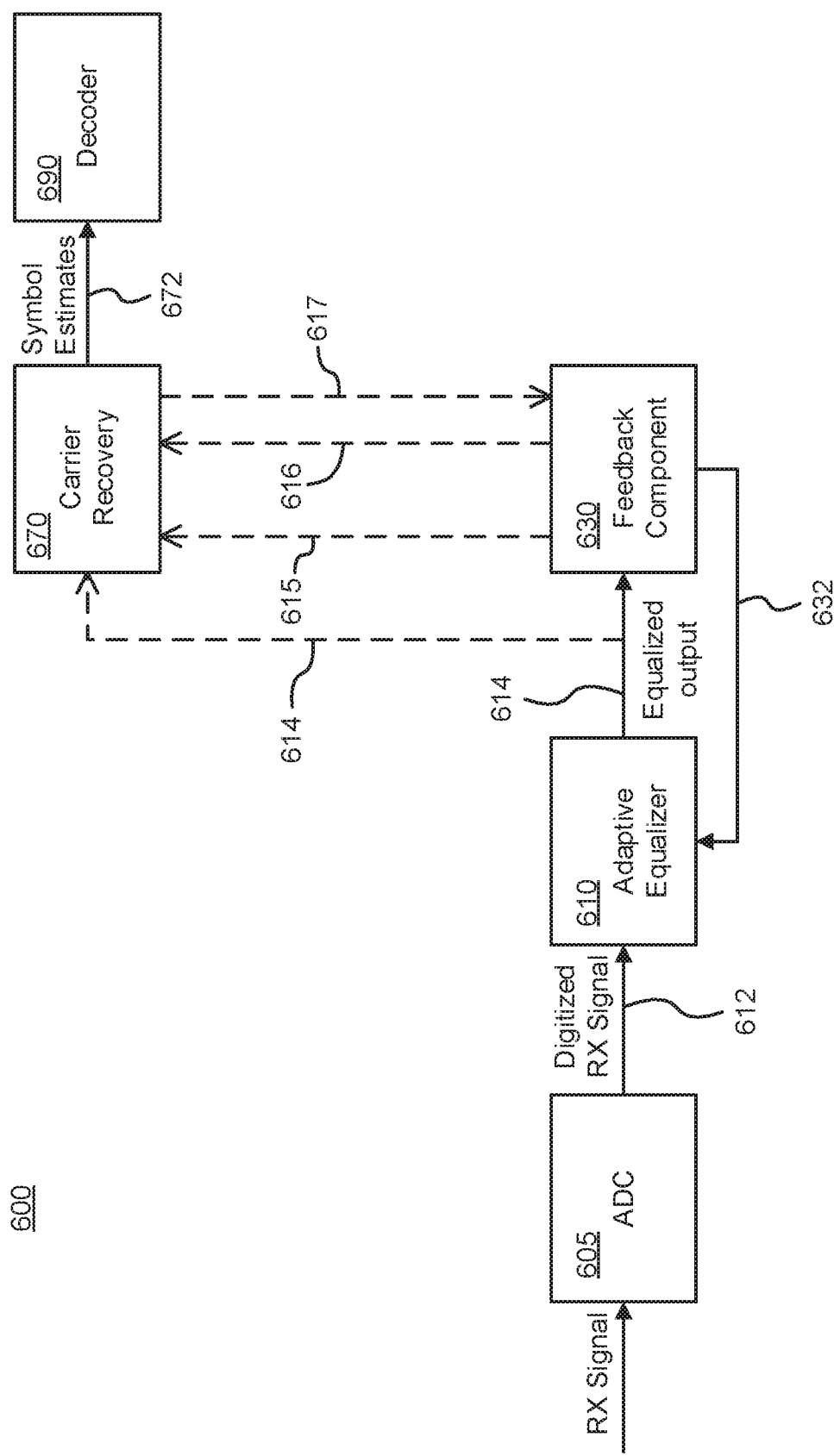
FIG. 6 illustrates an apparatus having partially disjoint feedback and carrier recovery components, in accordance with embodiments of the present invention.

Having reference now to FIG. 6, embodiments of the present invention provide for an apparatus 600 in a signal receiver, comprising at least an adaptive equalizer 610 and a feedback component 630. The adaptive equalizer 610 is configured to receive input 612 indicative of a received signal and to provide an equalized output 614 indicative of a corrected (e.g. adjusted to compensate for channel distortion, fading, or other effects) version of the received signal. The input 612 may be received from an analog to digital converter 605, for example. The equalized output 614 may be derived from applying filtering, such as FIR filtering, to the input 612, where the filter coefficients are updated using feedback. The feedback component 630 is configured to receive the equalized output 614 from the adaptive equalizer and to provide feedback 632 (for updating the filter coefficients) back to the adaptive equalizer 610 based on the equalized output 614.

In various embodiments, the apparatus 600 further includes a fine carrier recovery component 670 configured to directly or indirectly receive the equalized output 614 from the adaptive equalizer 610, and to provide estimates 672 of symbols carried in the received signal based on the equalized output. The carrier recovery component 670 is partially disjoint, that is, operates independently, from the feedback component 630, as will be explained below. The symbol estimates 672 may be provided to a decoder 690. The fine carrier recovery component 670 is configured to estimate and correct for phase and frequency offsets in the equalized output 614. This may include phase and frequency offsets not corrected for by the feedback component 630, or phase and frequency offsets corrected for by the feedback component 630 but not passed to the fine carrier recovery component. The fine carrier recovery component 670 is located outside of the adaptive filter loop. Decoupling the fine carrier recovery component 670 from the adaptive filter loop can reduce delay in adaptive filter loop while potentially improving the performance of the adaptive filter loop and improving adaptation speeds of the equalizer.

In some embodiments, the fine carrier recovery component 670 directly receives the equalized output 614 from the adaptive equalizer 610. The fine carrier recovery component 670 may partially serialize the equalized output prior to processing, for example by converting blocks of N symbols into smaller blocks of M symbols. As such, the feedback component 630 and the fine carrier recovery component 670 can operate in parallel with each other.

Furthermore, in some embodiments, at least a portion of data 616 generated by the feedback component, such as an estimate of phase offsets in the received signal, is provided to the fine carrier recovery component. Additionally or alternatively, in some embodiments, at least a portion of data 617 generated by the fine carrier recovery component, such as an estimate of frequency of components of the received signal, is provided to the feedback component. The feedback component 630 and the fine carrier recovery component 670 may include communication links, such as data lines, to facilitate this data exchange.

In other embodiments, the fine carrier recovery component 670 indirectly receives the equalized output 614 from the adaptive equalizer 610 in the following manner. The feedback component 630 performs an initial phase rotation on the equalized output 614 and provides the equalized output following the initial phase rotation 615 to the carrier recovery component 630. In some such embodiments, no other data is exchanged between the feedback component 630 and the fine carrier recovery component 670. In other such embodiments, other data may also be exchanged between these two components.

As such, in various embodiments, the fine carrier recovery component may operate on the equalized output 614 or on the equalized output following the initial phase rotation 615. In some embodiments, the fine carrier recovery component may use initial phase estimate data 616 provided by an initial phase estimator of the feedback component 630.

In various embodiments, one, some, or all of the adaptive equalizer 610, the feedback component 630, and the fine carrier recovery component 670 may operate on plural data inputs in parallel. For example, the adaptive equalizer 630 may operate concurrently on each input, of a block of N inputs, received in parallel from the ADC 605. The feedback component 630 may operate concurrently on each input, of a block of N inputs, received in parallel from the adaptive equalizer 610. As described below, the feedback component 630 may comprise both an initial carrier recovery component and a phase rotation and detection component. In some embodiments, at least the phase rotation and detection component operates on plural data inputs in parallel. In some embodiments both the initial carrier recovery component and the phase rotation and detection component operate on plural data inputs in parallel.

The data path from the adaptive equalizer through the phase rotation and detection component and back to the adaptive equalizer is referred to as the adaptive filter loop. For example, the adaptive filter loop involves a looped data path from the adaptive filter through the phase rotator, detector, phase de-rotator, error signal calculator, and coefficient update calculator. In various embodiments, the parallel vector width can be the same through all the portions of the adaptive filter loop. That is, each component in the adaptive filter loop can receive, operate on, and output blocks of N inputs in parallel.

The fine carrier recovery component 670 may operate concurrently on each input, of a block of M<N inputs, received from the adaptive equalizer 610. Alternatively, the fine carrier recovery component 670 may operate on a single input at a time. A (partial or full) serializer, also referred to as a block size converter, may receive and buffer a series of data blocks, each of size N, provided by the adaptive equalizer. The serializer re-allocates the buffered data into smaller data blocks of size M<N, and the smaller data blocks are provided as input to the fine carrier recovery component 670. Blocks of inputs are provided in series, such that a first block of inputs is provided a first time, a second block of inputs is provided at a second, later time, etc. Provided that the serializer outputs the smaller data blocks at a time-averaged rate of at least Nr/M, where r is the rate at which the serializer receives data blocks, then a buffer overflow condition can be avoided. If a large buffer is provided, the rate at which the serializer outputs data blocks can be temporarily lower than Nr/M.

In some embodiments, the phase and frequency offset variations in one vector is compensated in the fine carrier recovery component by processing data in smaller vectors. The fine carrier recovery component 670 may serialize the operation of phase and frequency offset correction on the adaptive equalizer output 614. To satisfy this, parallel carrier recovery 670 blocks may operate on different equalizer outputs. For example a first fine carrier recovery component may operate in a serial manner on the equalizer output 614 provided at a first time, while a second fine carrier recovery component may operate on the equalizer output 614 provided at a second, subsequent time, while the first carrier recovery component is busy with the current equalizer output. The fine carrier recovery component 670 may therefore include multiple carrier recovery sub-components operating in parallel. A demultiplexer may sequentially connect the equalizer output 614 to each sub-component in turn, or a queue of equalizer output blocks can be stored and operated on by carrier recovery sub-components as capacity permits.

In the prior art of the decision directed equalizers, the carrier recovery component (e.g. 420 in FIG. 4, comparable to component 670 of FIG. 6) is placed in the adaptive equalizer loop. In this configuration and to meet equalization performance requirement, the delay in the loop has to be tight, which limits the ability of perform more signal impairments correction, such as DC nulling and skew correction, before providing the data to the carrier recovery component.

In the current embodiments, the carrier recovery component 670 is disjoint from the adaptive equalizer loop. Therefore, adding more signal impairments correction before the component 670 is feasible without affecting the equalizer loop delay. The signal impairment correction blocks, such as DC nulling and skew correction, may improve the performance of the carrier recovery component 670. In some embodiments, therefore, one or more signal correction operations, such as DC nulling and skew correction, are performed on the equalizer 614 prior to its provision to the carrier recovery component 670, or these signal correction operations may be performed by the carrier recovery component 670, for example prior to other carrier recovery operations.

Figure 7:
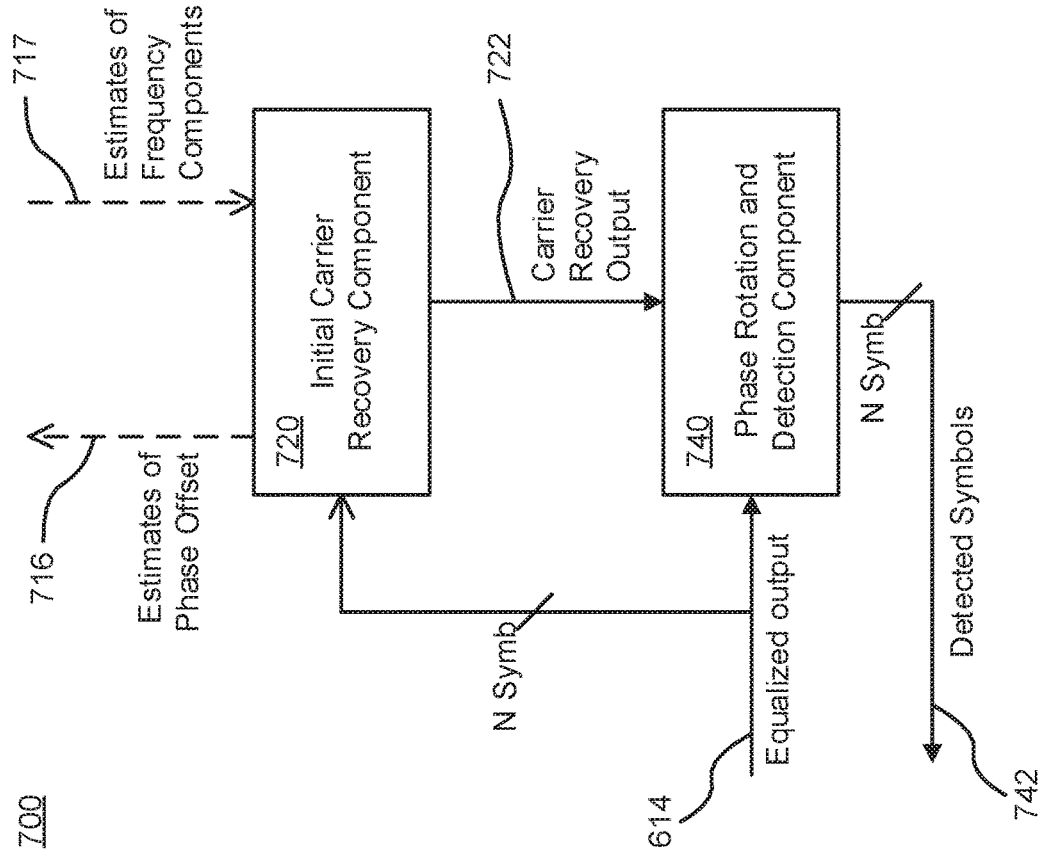
FIG. 7 illustrates a feedback component of an apparatus provided in accordance with an embodiment of the present invention, the feedback component having interacting initial carrier recovery and phase rotation and detection components.

Having reference now to FIG. 7, an embodiment of a feedback component 700, usable as the feedback component 630 of the apparatus 600, will now be described. The feedback component 700 includes an initial carrier recovery component 720 configured to generate a carrier recovery output 722 based on the equalized output 614 from the adaptive equalizer and an estimate 717 of frequency components of the received signal. The carrier recovery output is used at least to inform the phase rotation and phase de-rotation operations. In some embodiments, the estimate 717 is received from the carrier recovery component, and may be part of the data 617 received therefrom. In other embodiments, the estimate 717 of frequency components may be generated internally by the initial carrier recovery component 720. In some embodiments, the initial carrier recovery component can also provide output data such as estimates 716 of phase offset of the received signal. The initial carrier recovery component 720 may contain an integrator (also referred to as a ramp or ramp function, see e.g. ramp 830 in FIG. 8) that integrates the frequency offset estimate 717. The component 720 may also contain a numerical controlled oscillator (NCO) (see e.g. NCO 834 in FIG. 8) that may generate a sinusoidal signal with phase proportional to the sum of estimate of phase offset 716 and the integral of the estimate of frequency offset. In various embodiments, the carrier recovery output 722 is the NCO output. The NCO outputs a sinusoidal signal with a changing phase. The phase rotator (see e.g. phase rotator 842 in FIG. 8) within the component 740 may be a multiplier that multiplies the adaptive equalizer output 614 with the NCO output 416. Also a phase de-rotator (see e.g. phase de-rotator 850 in FIG. 8) within the component 740 may be implemented as a multiplier with the conjugate of the NCO output to reverse the function of the rotator.

The feedback component 700 further includes a phase rotation and detection component 740, which is configured to receive the equalized output 614 from the adaptive equalizer. The phase rotation and detection component 740 is further configured to detect symbols carried in the received signal based on the equalized output 614 following a phase rotation performed on the equalized output. The phase rotation is performed (by the phase rotation and detection component) based on the carrier recovery output 722 generated by the initial carrier recovery component 720 and provided to the phase rotation and detection component 740. The detected symbols are fed back 742 directly or indirectly to the adaptive equalizer. For indirect feedback, the detected symbols are subjected to a phase de-rotation (e.g. by a portion of the phase rotation and detection component following a detector) prior to feedback. The phase de-rotation may be equal in magnitude and opposite in direction to the phase rotation.

Having reference now to FIG. 8, one particular embodiment of the feedback component 700 of FIG. 7 will now be described. As with FIG. 7, the feedback component 800 of FIG. 8 includes an initial carrier recovery component 820 and a phase rotation and detection component 840. In other embodiments, the illustrated internal configuration of either or both of the initial carrier recovery component 820 or the phase rotation and detection component 840 can be varied.

The initial carrier recovery component 820 is configured to receive the equalized output 614 from the adaptive equalizer and generate an initial estimate 824 of phase offset in the received signal based on the equalized output 614. The initial estimate 824 may be provided by an initial phase estimator 822. In some embodiments, the initial phase estimate 824, or related output, may also be provided to an external component, such as a fine carrier recovery component. As such, the initial phase estimator uses part or all of the adaptive filter output to determine (e.g. calculate) an initial phase offset. The initial phase estimator 822 may operate by comparing phase offset in received pilot sequence in 614 with original known pilot sequence to estimate phase offset 824 and may also estimate the initial frequency offset.

In some embodiments, the initial phase estimator 822 may use one or more training sequences in the equalized output 614 to estimate the phase offset. The component 840 uses this estimated phase offset with the frequency offset to rotate equalizer output 614.

The initial carrier recovery component 820 is further configured to generate a further indication 832 of phase offset in the received signal based on an estimate 817 of frequency of components of the received signal. The estimate 817 may be received from another component of the receiver, such an external (fine/final) carrier recovery component operating partially disjointly from the initial carrier recovery component 820. In other embodiments, the estimate 817 may be internally generated by the initial carrier recovery component 820. In some embodiments, as illustrated, the frequency estimate 817 (or related data), referred to herein as $\hat{w}$, is either estimated using a training sequence in the equalizer output 614 or is based on information provided (817a) from the fine carrier recovery component (or a combination thereof). The frequency offset is typically relatively slowly changing with time, so the frequency estimate from the fine carrier recovery component can be used in initial carrier recovery component, even though the data processed in the fine carrier recovery component is older than the data currently being processed in the initial carrier recovery component. The frequency estimate $\hat{w}$ may include one value for each equalizer output, and it is passed to a ramp function 830 which essentially integrates the frequency estimate 817 to generate the further indication 832 of phase offset $\hat{w}t$. In a Typical Implementation, the ramp component actually creates a discrete time series of $\hat{w}t$ that is equal in length to the width of the equalizer output bus 614. The output of the ramp component is a discrete sequence $\hat{w}nT$, where T is the sampling period and n is the time order index of the samples in the equalizer output 614. The initial phase estimator component may use training sequences in the equalizer output data to estimate the phase offset as one value. Referring to the initial phase offset 824 as $\hat{\theta}$, the NCO component 834 adds the initial phase estimate $\hat{\theta}$ to the ramp output time sequence 832 and generates a sinusoidal signal 838 that has constant phase $\hat{\theta}$ and constant frequency $\hat{w}$ with width equal to the equalizer output bus width. The generated sinusoidal signal can be denoted $\exp(j(\hat{w}nT+\hat{\theta}))$, where j is $\sqrt{-1}$. The sinusoidal signal 838 or the complex conjugate of it is used to rotate or de-rotate equalizer output 614 or detector output 848. The output of the NCO is a sinusoidal signal with sinusoidal phase changing with the phase offset estimate and the integration of the frequency offset estimate.

The initial carrier recovery component 820 is further configured to generate a carrier recovery output 838 based on the initial phase estimate 824 and the further indication 832 of phase offset. The initial estimate 824 of phase offset may be an estimate of phase offset at initial time, which used as an estimate for the input vector 614. The exact phase offset per symbol correction is determined during the fine carrier recovery operation. For example, in some embodiments, as illustrated, a numerically controlled oscillator (NCO) 834 receives the initial estimate 824 of phase offset as well as the further indication 832 of phase offset. Based on these, the NCO 834 generates the carrier recovery output 838. The initial phase offset 824 and the integral of frequency offset 832, or other further indication of phase offset (also referred to as the phase offset vector) are used to generate a carrier recovery output 838 for phase-rotating the adaptive equalizer output. Generating the carrier recovery output may include operating an NCO based on the initial estimate of phase offset and the integral of frequency offset.

In more detail, in various embodiments, the initial estimate 824 of phase offset is added to the phase offset vector (i.e. integral of frequency offset 832) and the sum is used as the amount of phase rotation, in the carrier recovery output 838, to be applied to the adaptive equalizer output.

In some embodiments, the initial carrier recovery component 820 is further configured to provide an estimate of phase offsets in the received signal to a fine carrier recovery component of the receiver. As mentioned elsewhere herein, the fine carrier recovery component is separate from the initial carrier recovery component and the phase rotation and detection component.

The phase rotation and detection component 840 comprises a phase rotator 842, a detector 846, and, in some but not necessarily all embodiments, a phase de-rotator 850. The phase rotation and detection component 840 receives the equalized output 614. The phase rotator 842 is configured to perform a phase rotation on the equalized output 614 based on the carrier recovery output 838 received from the initial carrier recovery component 820. For example, the phase rotator may rotate the equalized output 614 with the sum of initial phase offset 824 and the phase offset vector (i.e. integral of frequency offset 832). The detector 846 receives output 844 from the phase rotator 842 and is configured to detect symbols carried in the received signal based on the equalized output following the phase rotation. That is, the output 844 of the phase rotator 842 is passed through the detector 846. The detector is further configured to provide a detector output 848 indicative of the detected symbols. The phase de-rotator 850 is configured to perform a phase de-rotation on the detector output 848. The phase de-rotation opposes the phase rotation performed by the phase rotator 842, i.e. such that the phase de-rotation is equal in magnitude and opposite and direction to the phase rotation. The phase de-rotation is also performed based on the carrier recovery output 838 of the initial carrier recovery component 820. The phase de-rotated detector output 852 is fed back to the adaptive equalizer, where it is used in a process for updating the coefficients of the adaptive filter thereof. The output of the detector is therefore used by the adaptive equalizer, for example by an error signal calculator thereof, to calculate an error signal for use in updating the adaptive filter coefficients. For example, the error signal can be passed to a coefficient update calculator and used thereby to update the adaptive filter coefficients.

In some embodiments, the phase rotation and detection component 840 is configured to provide the equalized output 844 following the phase rotation as symbol input to a separate fine carrier recovery component. This alternative arrangement allows the fine carrier recovery component to benefit from the already-performed initial phase rotation by the phase rotator 842.

Figure 13:
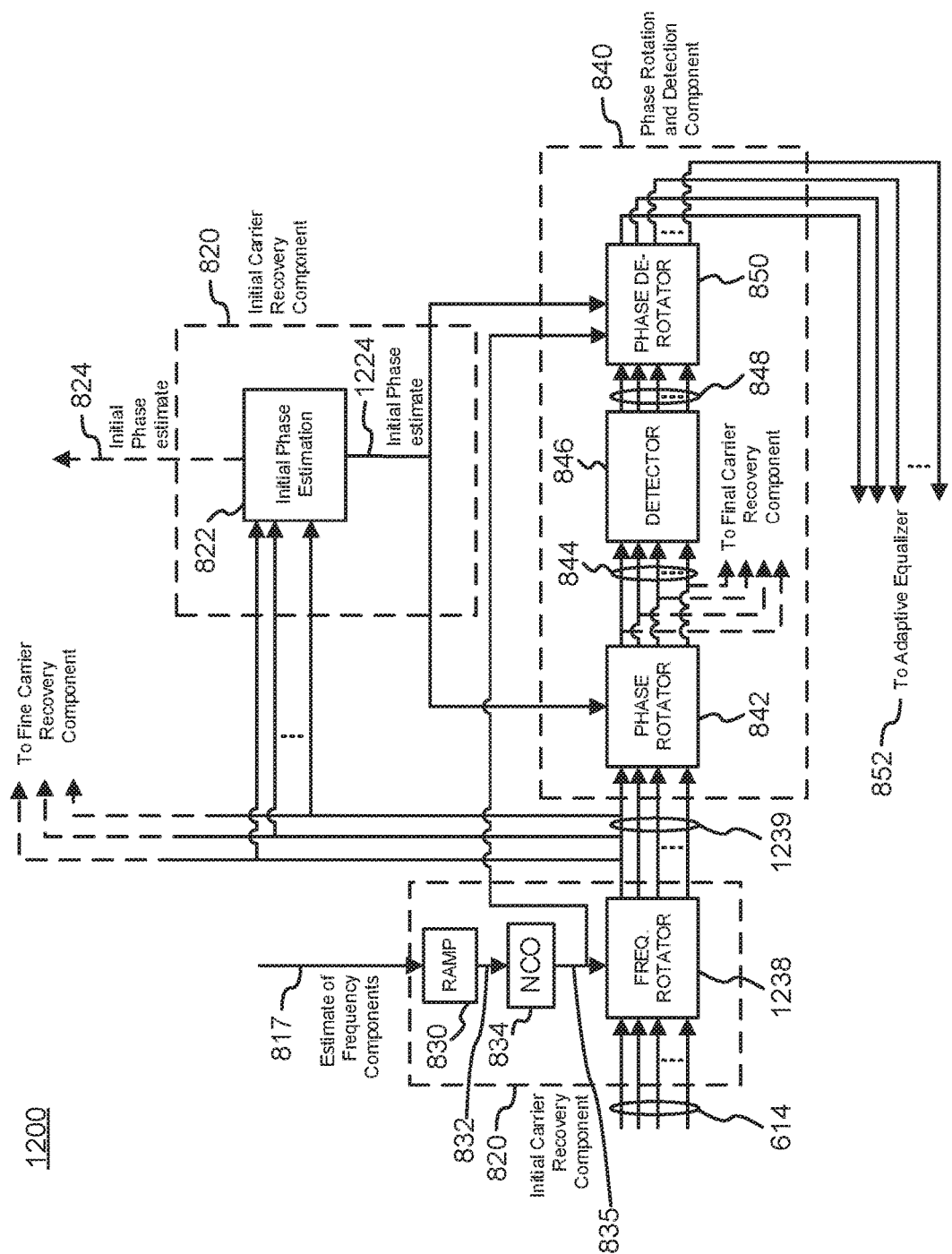
FIG. 13 illustrates an apparatus provided in accordance with another embodiment of the present invention, corresponding to an alternative configuration of the initial carrier recovery component.

Operation of another embodiment of initial carrier recovery block 820 is illustrated in FIG. 13. In this embodiment, the ramp component 830 integrates the estimate of frequency components 817 that may be calculated in and provided by the fine carrier recovery component, or in and provided by the initial carrier recovery component using a training sequence in the equalizer output 614. The estimate of the frequency component 817, referred to herein as 0, may be integrated by the ramp component 830. The output 832 of the ramp component is the phase sequence ŵnT that may be used by the NCO component 834 to generate a sinusoidal signal output 835 that can be denoted by exp(j(ŵnT)). The output 835 of the NCO may be provided to and used by the frequency rotator component 1238 to rotate the output of the equalizer 614. The frequency rotator component 1238 may comprise a multiplier that multiplies the equalizer output with the NCO output sinusoidal sequence 832. The output 1239 of the frequency rotator component 1238 is fed to both the initial carrier recovery component 820 and the phase rotation and detection component 840. In this embodiment, the frequency offset is corrected first using the frequency rotator component 1238 and the phase offset is estimated afterward in Initial Phase Estimation component 822. By correcting the frequency offset first, the initial phase estimation component 822 may or may not use training to estimate the phase offset. The initial phase estimation component 822 may test pre-selected phase offset values and choose the phase offset that minimizes mean square error in the frequency rotator component output 1239. The output of the initial phase estimation component 822 (i.e. the initial phase estimate 1224) is a single phase estimate used (by the phase rotation and detection component 840) to rotate all the output 1239 of the frequency rotator 1238. There is no need to have an NCO in the initial carrier recovery component 820 in this embodiment because the initial phase estimate is one value, referred to herein as θ̂, and the phase rotator component 842 may multiply all the outputs 1239 of the frequency rotator component by exp(jθ̂) which is one complex phase. The phase de-rotation component 850 reverses the operation of both the phase rotator component 842 and the frequency rotator component 1238. The phase de-rotator component 850 adds the NCO output sequence 832 to the phase offset exponent from the initial phase estimation output 1224 to form the total phase offset sequence denoted by exp(j(ŵnT+θ̂)) and multiplies this sequence with the output 848 of the detector component 846.

Figure 8:
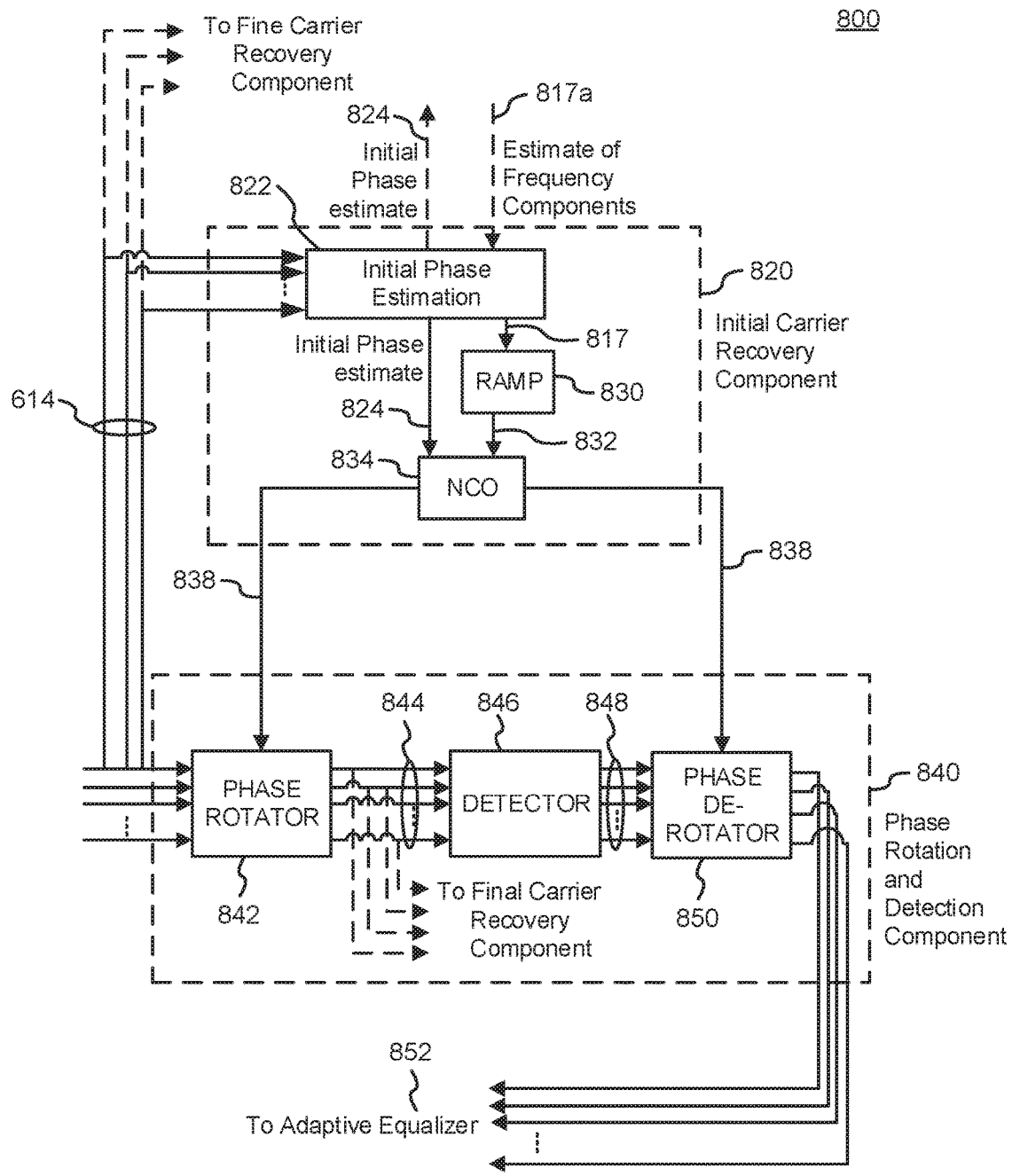
FIG. 8 illustrates details of the feedback component of FIG. 7, in accordance with a further embodiment of the present invention.
Figure 9:
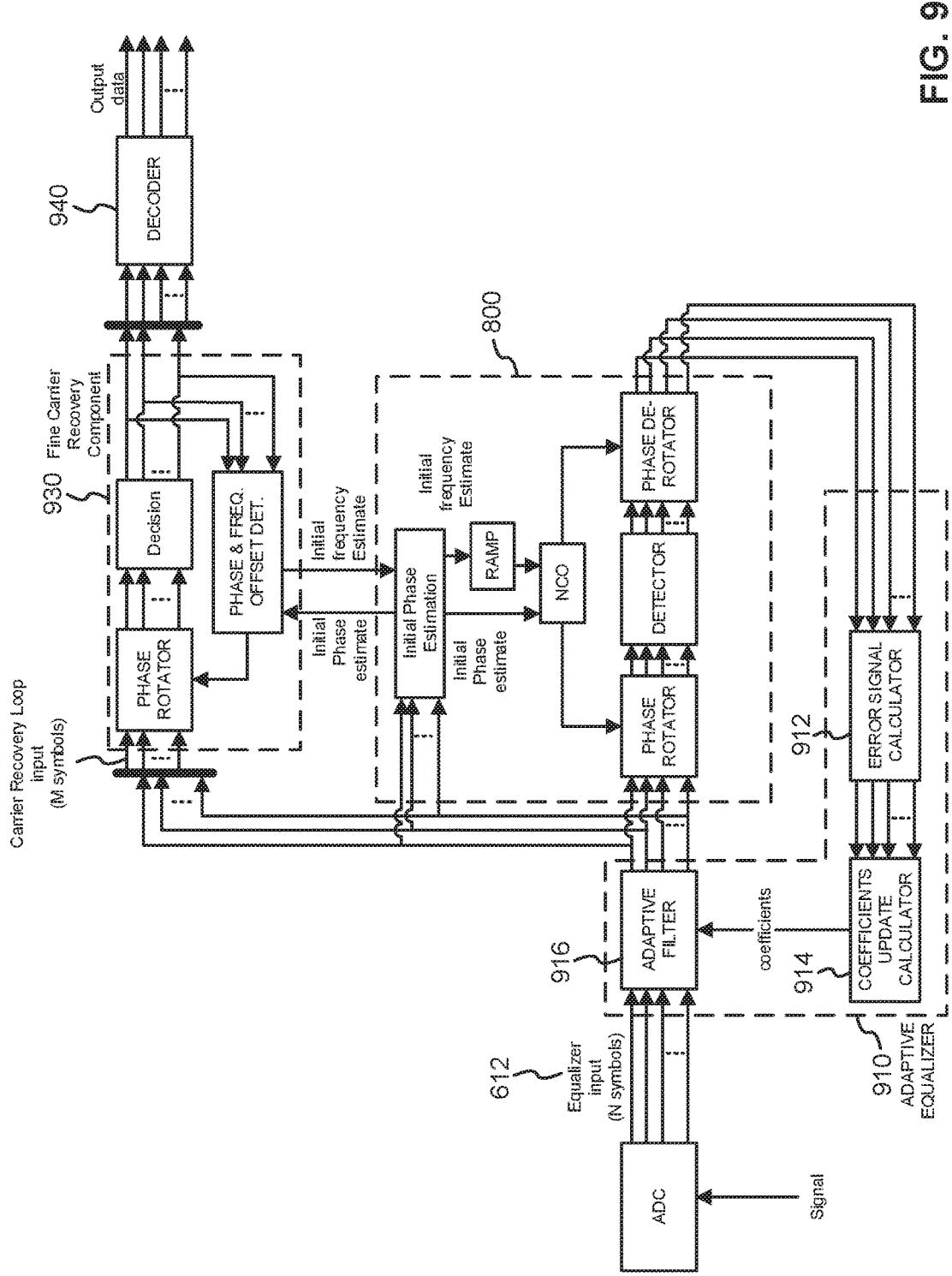
FIG. 9 illustrates an apparatus provided in accordance with another embodiment of the present invention, the apparatus incorporating the components of FIG. 8.

FIG. 9 illustrates the apparatus 800 of FIG. 8, integrated with an adaptive equalizer 910 and a fine carrier recovery component 930, along with a decoder 940 which receives data from the fine carrier recovery component 930, in accordance with an embodiment of the present invention. The apparatus 800 operates as described above with respect to FIG. 8 to provide feedback to the adaptive equalizer 910, and also to exchange data with the fine carrier recovery component 930. As such, the apparatus 800 and the fine carrier recovery component 930 operate in a partially disjoint manner.

Figure 10:
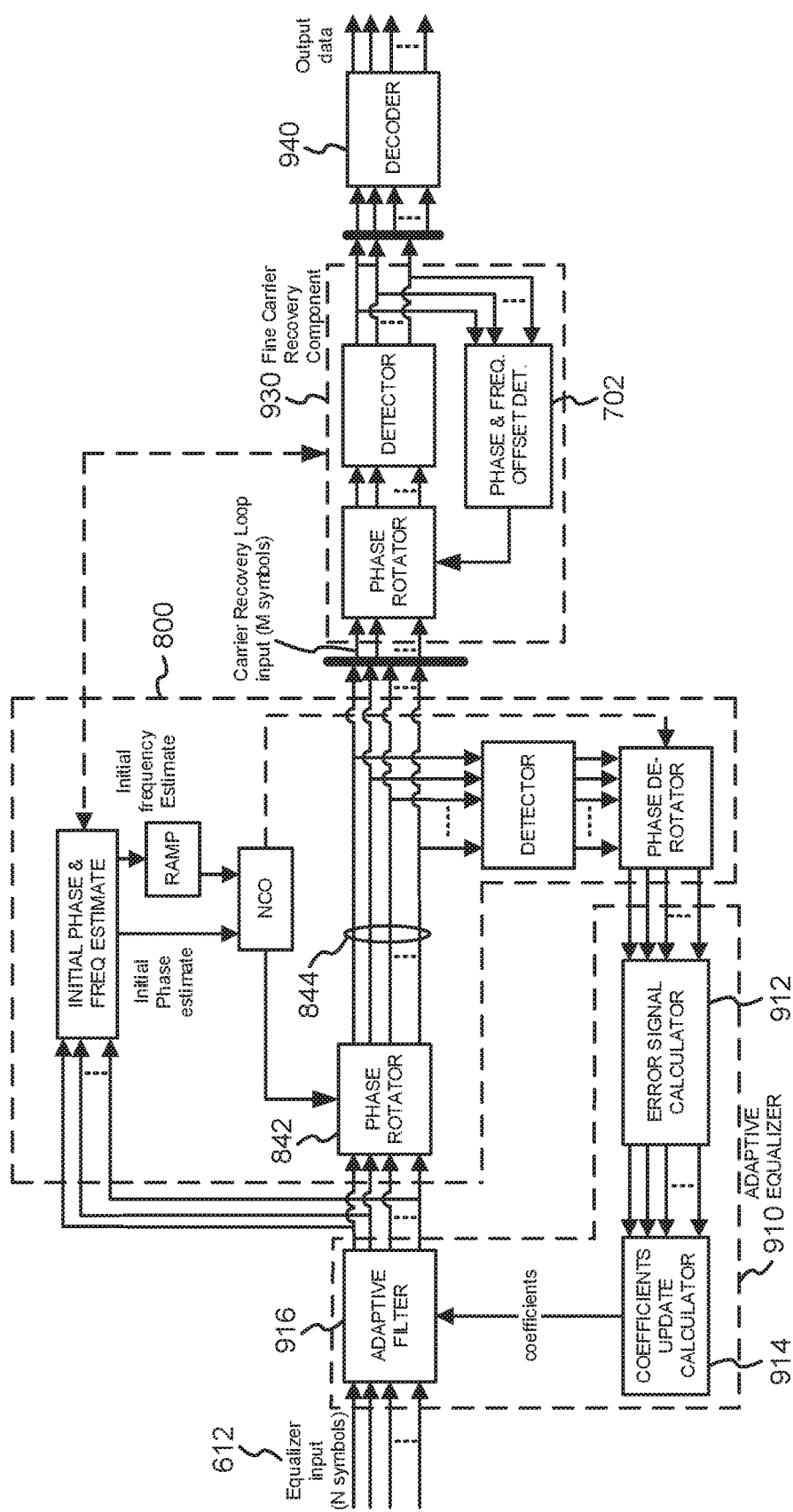
FIG. 10 illustrates an apparatus provided in accordance with another embodiment of the present invention, corresponding to an alternative configuration of the feedback component and fine carrier recovery component.

FIG. 10 illustrates the apparatus 800 of FIG. 8, integrated with an adaptive equalizer 910 and a fine carrier recovery component 930, along with a decoder 940 which receives data from the fine carrier recovery component 930, in accordance with another embodiment of the present invention. The apparatus 800 again operates as described above with respect to FIG. 8 to provide feedback to the adaptive equalizer 910. Rather than, or optionally in addition to, exchanging phase and frequency estimates between the apparatus 800 and the fine carrier recovery component 930, the output 844 of the phase rotator 842 is provided to the input of the fine carrier recovery component 930.

As illustrated in FIGS. 9 and 10, both the adaptive equalizer 910 and the apparatus 800 may operate on blocks of N symbols in parallel. The fine carrier recovery component 930 may operate on M<N symbols in parallel. The decoder 940 may operate on N symbols in parallel.

Further details regarding the adaptive equalizer 910 of FIGS. 9 and 10 will now be provided. A worker skilled in the art will readily understand general operation of the adaptive equalizer itself. The adaptive equalizer includes an error signal calculator 912, a coefficient update calculator 914, and an adaptive filter 916. The error signal calculator is configured to calculate the error between the output of the adaptive filter 916 and the output of the detector 846, for example following phase de-rotation (i.e. output 852). The phase de-rotation phase-aligns the signals received by the error signal calculator so that a proper comparison can be performed. The coefficient update calculator 914 updates the coefficients for use by the adaptive filter based on the error signal provided by the error signal calculator 914.

In various embodiments, adaptive filter coefficient updating can be performed in accordance with the following equation: $W(n+1)=W(n)+J(e(n),X(n))$, where W(n) is the adaptive filter coefficient vector, e(n) is the error vector, X(n) is input of the adaptive filter and J(.) is a function of the error vector and/or filter input.

The fine carrier recovery component 930 operates similarly to the carrier recovery component 420 of FIG. 4. However, the fine carrier recovery component 930 may omit a phase de-rotator. Further, the fine carrier recovery component 930 may transmit data to the initial carrier recovery component 800, receive data from the initial carrier recovery component 800, or both. With the Fine carrier recovery component 930 being separate from the equalizer loop, there is freedom in complexity level of the design of this component. Also more impairment correction operations (or corresponding components) can be implemented before operation of the fine carrier recovery component 930 to improve the phase estimate provided thereby. These impairment correction operations may be integrated in the carrier recovery component 930 or performed on the filter output 614 prior to the input to the fine carrier recovery component 930, either before or after serialization.

Figure 11:
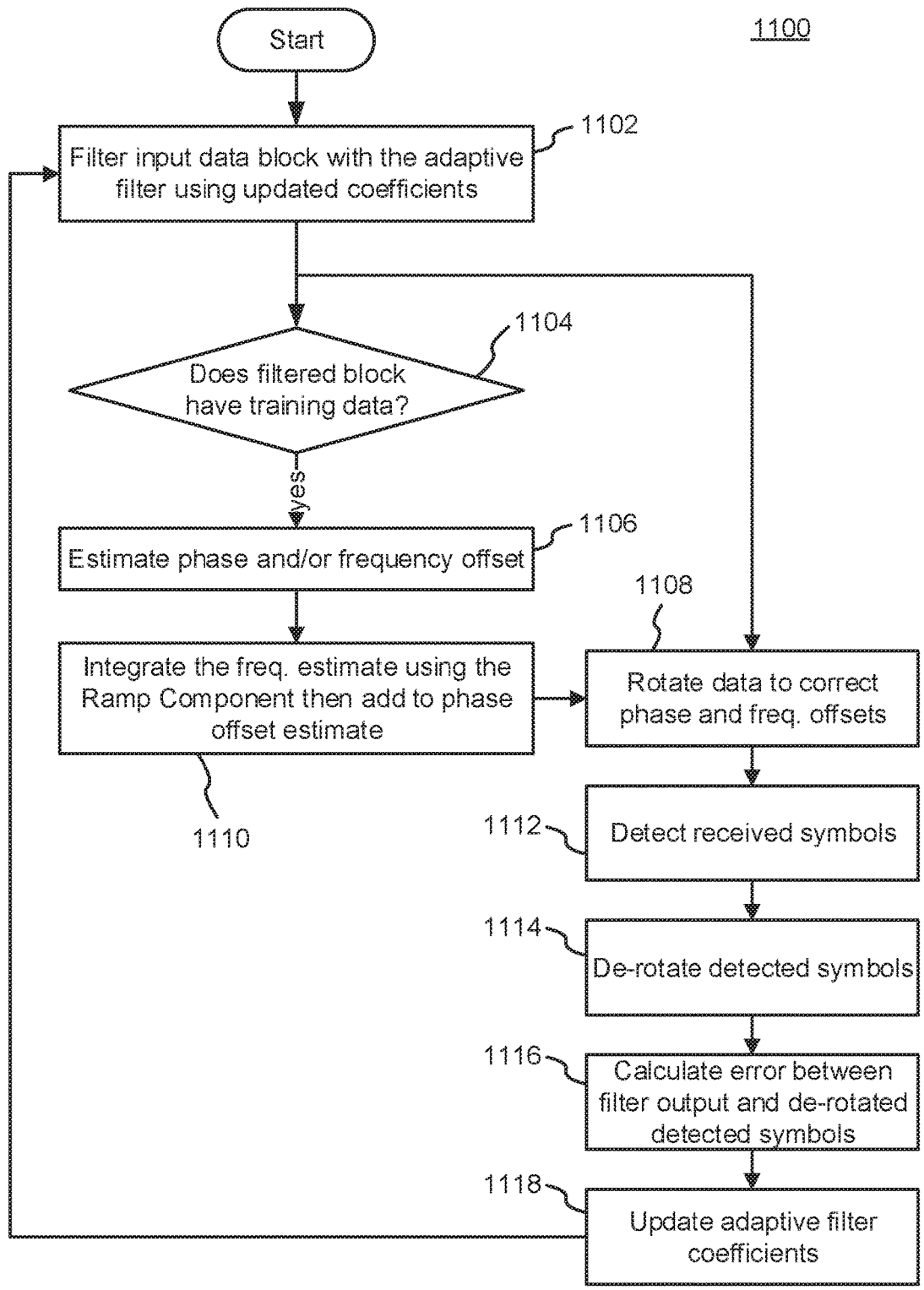
FIG. 11 illustrates a method for operating an adaptive equalizer, in accordance with embodiments of the present invention.

FIG. 11 illustrates a method 1100 for operating an adaptive equalizer, in accordance with an embodiment of the present invention. This method corresponds to operation of the adaptive equalizer and embodiments of the feedback component as described above. The method includes filtering 1102 a block of input data using the adaptive filter, where the adaptive filter is implied using a current set of filter coefficients. The method further includes determining 1104 if the data block output by the adaptive filter includes training data. If so, the method further includes estimating 1106 phase and frequency offsets in the received signal based on the training data. In this case, the method also further includes integrating the frequency estimate and adding the integral output to the phase offset estimate.

The method further includes rotating 1108 the output of the adaptive filter to correct for phase and frequency offsets.

If the data block included training data, the rotation is based on the current results obtained from operation 1110. Otherwise, the rotation may be based on other data, such as the results obtained from the most recent previous iteration of operation 1110. The method includes subsequently detecting 1112 originally transmitted symbols in the data block based on the phase-rotated output of the adaptive filter. The method includes subsequently de-rotating 1114 the detected symbols, that is, performing a phase rotation on the detected symbols that is equal in magnitude and opposite in sign to the phase rotation applied to the adaptive filter output in operation 1108.

The method further includes, for example by suitable components of the adaptive equalizer, calculating 1116 an error between the adaptive filter output and the de-rotated detected symbols provided by operation 1114. The method further includes, for example by the components of the adaptive equalizer, updating 1118 the adaptive filter coefficients based on the calculated error.

Figure 12A:
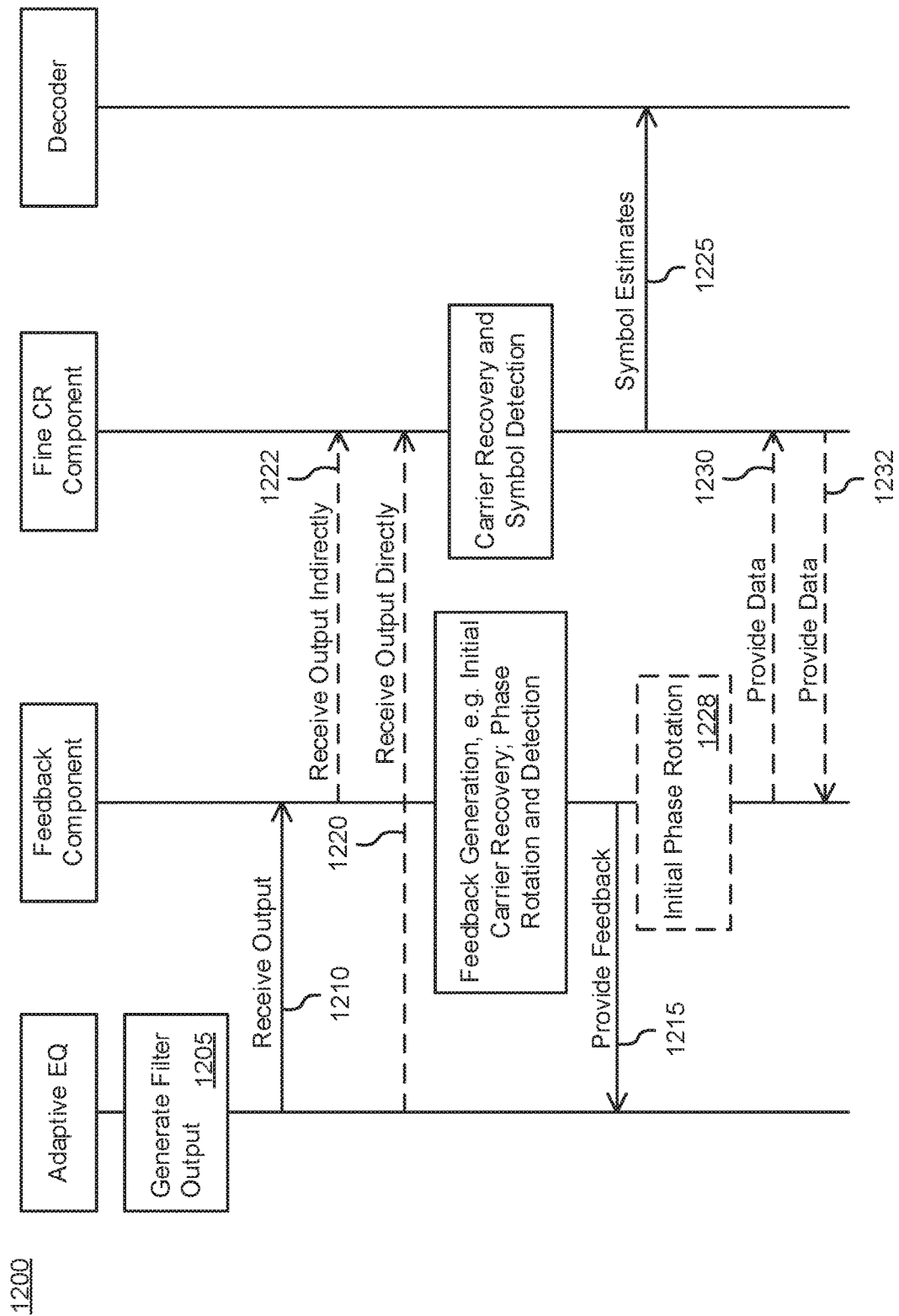
FIGS. 12A to 12C illustrate a method for operating a signal receiver comprising an adaptive equalizer, in accordance with another embodiment of the present invention.

FIG. 12A illustrates a method 1200 for operating a signal receiver, according to an embodiment of the present invention. It is noted that, in some embodiments, only parts of the illustrated method are provided. The method includes generating (or otherwise providing) 1205, by an adaptive equalizer, an equalized output indicative of a corrected version of a received signal. The equalized output is generated using currently available filter coefficients. The method further includes receiving 1210, by a feedback component, the equalized output from the adaptive equalizer. The method further includes providing 1215 feedback from the feedback component to the adaptive equalizer, based on the equalized output. This feedback is usable for updating the filter coefficients. The method may further include directly receiving 1220 the equalized output from the adaptive equalizer by a fine carrier recovery component separate from the feedback component. The method alternatively includes indirectly receiving 1222 the equalized output from the adaptive equalizer by the fine carrier recovery component. That is, the feedback component can send the equalized output to the fine carrier recovery component, possibly after some modification such as initial phase rotation. The method further includes providing 1225, by the fine carrier recovery component, estimates of symbols carried in the received signal based on the equalized output.

In some embodiments the method 1200 further includes one or both of: providing at least a portion of data 1230 generated by the feedback component to the fine carrier recovery component; and providing at least a portion of data 1232 generated by the fine carrier recovery component to the feedback component. For example, in some embodiments, the method further includes, by the feedback component, performing an initial phase rotation 1228 on the equalized output and providing the equalized output following the initial phase rotation as the data 1230 to the fine carrier recovery component.

Figure 12B:
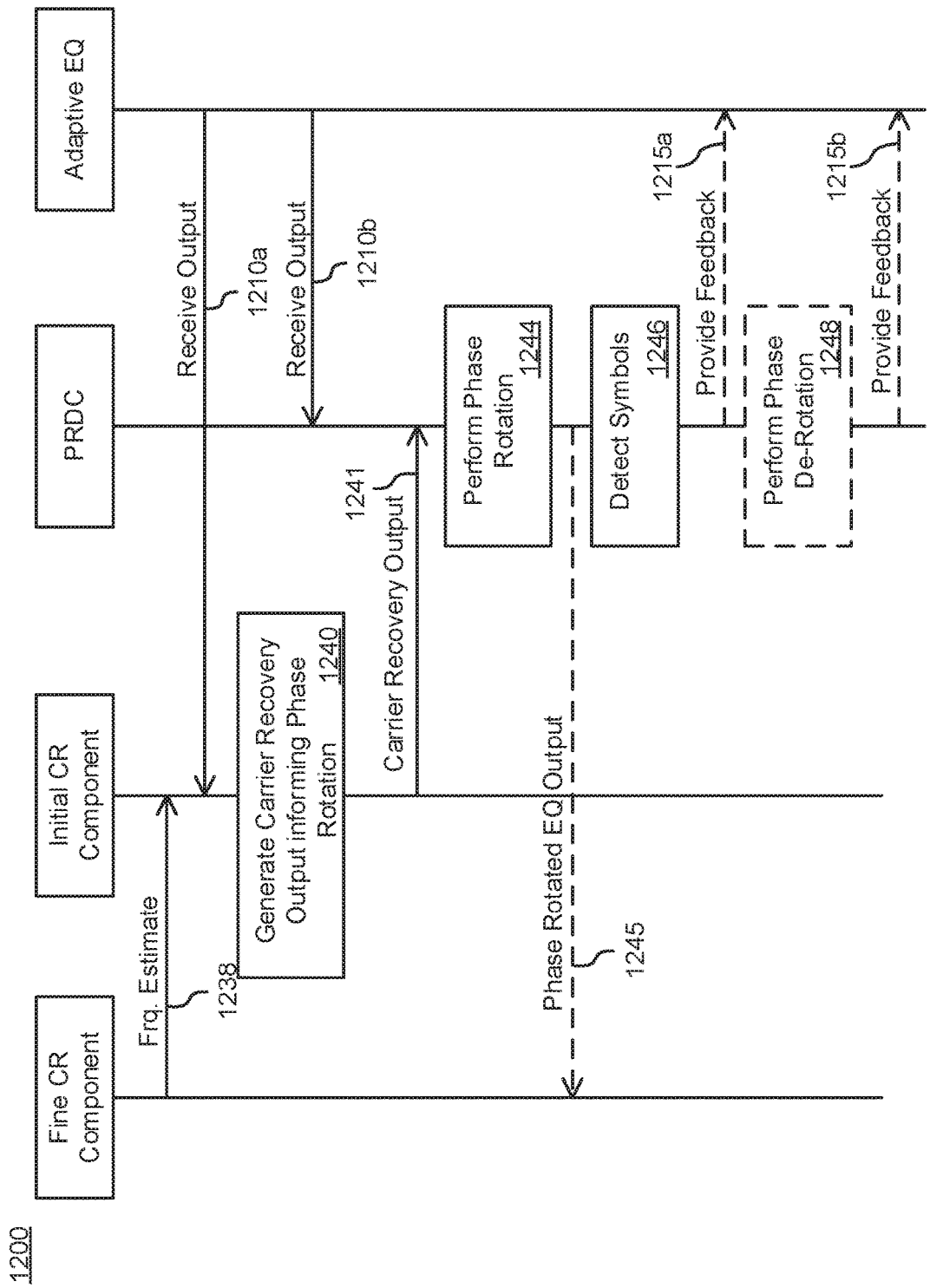

Having reference now to FIG. 12B, in some embodiments, the method 1200 further includes, by an initial carrier recovery sub-component (ICRC) of the feedback component, generating 1240 a carrier recovery output based on the equalized output received 1210*a* from the adaptive equalizer and an estimate of frequency components of the received signal. The carrier recovery output informs the phase rotation operation. For example, the carrier recovery output may be a sinusoidal signal with a particular phase, generated by an NCO. The estimate is received 1238 from the fine carrier recovery component. The method further includes, by a phase rotation and detection (PRDC) sub-component of the feedback component, receiving 1210*b* the equalized output from the adaptive equalizer. The PRDC also receives 1241 the carrier recovery output from the ICRC. The method further includes, by the PRDC, performing 1244 a phase rotation on the equalized output. In some embodiments, the phase-rotated output can be provided 1245 to the fine carrier recovery component. The method further includes, by the PRDC, detecting 1246 symbols carried in the received signal based on the equalized output following the phase rotation. The phase rotation is performed based on the carrier recovery output generated 1240 by the initial carrier recovery component. The detected symbols may be fed back 1215*a* directly to the adaptive equalizer. Alternatively, the method may further include performing a phase de-rotation 1248 on the detected symbols, and feeding back 1215*b* the detected symbols indirectly to the adaptive equalizer, that is, following the phase de-rotation 1248.

Figure 12C:
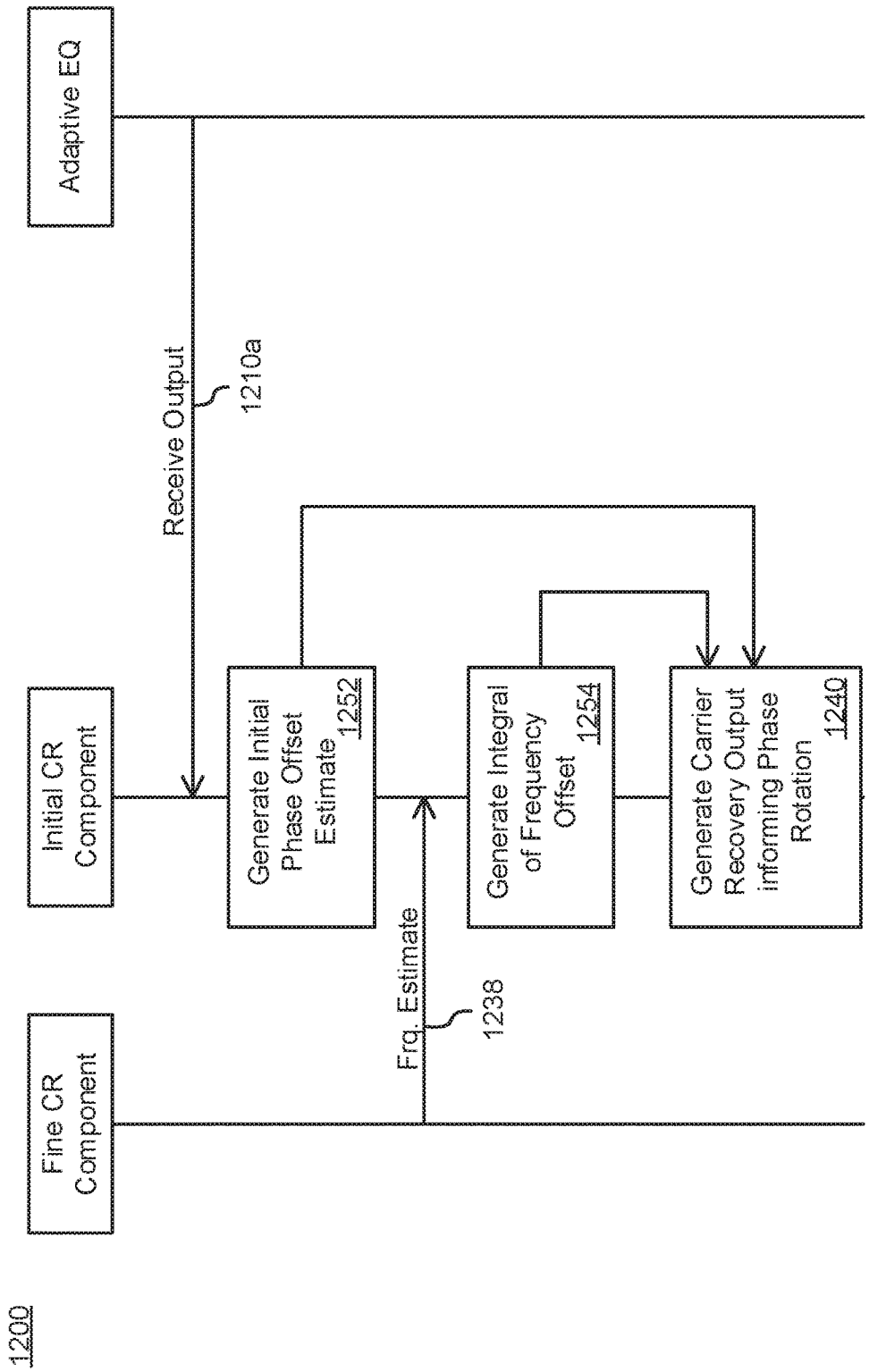

Having reference now to FIG. 12C, in some embodiments, the method 1200 further includes the following operations, performed by the initial carrier recovery sub-component (ICRC) of the feedback component. The method again includes receiving 1210*a* the equalized output from the adaptive equalizer and receiving 1238 an estimate of frequency of components of the received signal. The method includes generating 1252 an initial estimate of phase offset in the received signal based on the equalized output. The method includes generating 1254 an integral of frequency offset in the received signal based on the received estimate of frequency of components. The generation 1254 may be performed by an integration operation, for example using a ramp function. The method includes generating 1240 the carrier recovery output based on the initial estimate of phase offset and the integral of frequency offset.

As will be readily understood by a person skilled in the art, embodiments of the present invention can be implemented using a variety of electronic devices. For example, various components can be implemented using a processor such as a digital signal processor, an application specific integrated circuit (ASIC), or a field programmable gate array (FPGA), or a combination thereof. A processor may execute program instructions stored in memory in order to carry out operations as described herein. However, it is considered that the use of dedicated electronic devices such as integrated circuits may be more suitable for at least some practical embodiments. One or a combination of integrated circuits, for example driven by a clock, can be configured during or following manufacture to implement the various operations and components described herein. In some embodiments, optical signals received via an optical transmission line can be converted into electronic signals via suitable detectors, and converted into digital form using analog-to-digital converters. The digitized signals are then received and processed by other components as described above. Each of the various components described herein, such as the adaptive equalizer, feedback component, fine carrier recovery component, and sub-components thereof, such as the initial carrier recovery component, phase rotation and detection component, phase rotator, phase de-rotator, detector, initial phase estimator, ramp, NCO, decision component, phase and frequency offset detector, etc. can be implemented using such electronic devices. Multiple components can be partly or fully provided using the same electronic device, different components can be provided using different operatively coupled electronic devices, or a combination thereof. Methods as described herein can similarly be implemented using such electronic devices.

In some embodiments, for example for prototyping purposes and provided that sufficient processing capability is available, the present invention can be implemented partially or fully using a computer processor executing instructions provided in software. Similarly, in some embodiments, the present invention can be implemented in firmware, using an electronic device executing program instructions provided as part of the firmware. However, it is noted that software and firmware implementations may not have sufficient speed at this time for at least some practical applications.

What is claimed is:

1. An apparatus in a signal receiver for providing feedback to an adaptive equalizer of the signal receiver, the apparatus comprising:
   an initial carrier recovery component configured to generate a carrier recovery output based on equalized output received from the adaptive equalizer and an estimate of frequency components of a received signal;
   a phase rotation and detection component configured to receive the equalized output from the adaptive equalizer and to detect symbols carried in the received signal based on the equalized output following a phase rotation performed on the equalized output, the phase rotation performed based on the carrier recovery output generated by the initial carrier recovery component, the phase rotation and detection component configured to provide the detected symbols for feedback directly or indirectly to the adaptive equalizer; and
   a fine carrier recovery component separate from the initial carrier recovery component and the phase rotation and detection component, wherein the phase rotation and detection component is configured to provide the equalized output following the phase rotation as symbol input to the fine carrier recovery component.

2. The apparatus of claim 1, wherein the initial carrier recovery component is further configured to:
   generate an initial estimate of phase offset in the received signal based on the equalized output;
   generate an integral of frequency offset in the received signal based on the estimate of frequency of components of the received signal; and
   generate the carrier recovery output based on the initial estimate of phase offset and the integral of frequency offset.

3. The apparatus of claim 2, wherein generating the integral of frequency offset comprises integrating the estimate of frequency components using a ramp function.

4. The apparatus of claim 2, wherein generating the carrier recovery output comprises operating a numerically controlled oscillator based on the initial estimate of phase offset and the integral of frequency offset.

5. The apparatus of claim 1, wherein the phase rotation and detection component is further configured to:
   perform the phase rotation on the equalized output;
   provide a detector output indicative of the detected symbols; and
   perform a phase de-rotation on the detector output, the phase de-rotation opposing the phase rotation and performed based on the carrier recovery output of the initial carrier recovery component, the phase de-rotated detector output fed back to the adaptive equalizer as the detected symbols.

6. The apparatus of claim 1, wherein the estimate of frequency components is received from another component of the signal receiver.

7. The apparatus of claim 6, wherein the other component of the signal receiver is the fine carrier recovery component, the fine carrier recovery component configured to provide estimates of symbols carried in the received signal based on the equalized output, wherein the fine carrier recovery component is partially or fully disjoint from the initial carrier recovery component and the phase rotation and detection component.

8. The apparatus of claim 7, further configured to provide an estimate of phase offsets in the received signal to the fine carrier recovery component.

9. The apparatus of claim 1, wherein the apparatus operates on plural data inputs in parallel.

10. The apparatus of claim 1, wherein the equalized output comprises a first number N of symbols in parallel, the initial carrier recovery component and the phase rotation and detection component are configured to operate on all of the N symbols in parallel, and the fine carrier recovery component is configured to operate on a second number M of the N symbols in parallel, wherein M is less than N.

11. The apparatus of claim 1, wherein the equalized output comprises a first number N of symbols in parallel, the initial carrier recovery component and the phase rotation and detection component are configured to operate on all of the N symbols in parallel, and the fine carrier recovery component is configured to operate serially on the N symbols.

12. A method for operating a signal receiver, comprising:
   by an initial carrier recovery component, generating a carrier recovery output based on:
   equalized output received from an adaptive equalizer of the signal receiver, and an estimate of frequency components of a received signal;
   by a phase rotation and detection component:
      receiving the equalized output from the adaptive equalizer;
      performing a phase rotation on the equalized output, based on the carrier recovery output generated by the initial carrier recovery component;
      detecting symbols carried in the received signal based on the equalized output following the phase rotation;
      feeding back the detected symbols directly or indirectly to the adaptive equalizer; and
      providing the equalized output following the phase rotation as symbol input to a fine carrier recovery component, wherein the fine carrier recovery is component separate from the initial carrier recovery component and the phase rotation and detection component.

13. The method of claim 12, further comprising, by the initial carrier recovery component:
   generating an initial estimate of phase offset in the received signal based on the equalized output;
   generating an integral of frequency offset in the received signal based on the estimate of frequency of components of the received signal; and
   generating the carrier recovery output based on the initial estimate of phase offset and the integral of frequency offset.

14. The method of claim 12, further comprising, by the phase rotation and detection component:
   performing the phase rotation on the equalized output;
   providing a detector output indicative of the detected symbols;
   performing a phase de-rotation on the detector output, the phase de-rotation opposing the phase rotation and performed based on the carrier recovery output of the initial carrier recovery component; and feeding back the phase de-rotated detector output to the adaptive equalizer as the detected symbols.

15. The method of claim 12, wherein the estimate of frequency components is received from the fine carrier recovery component, the fine carrier recovery component configured to provide estimates of symbols carried in the received signal based on the equalized output, wherein the fine carrier recovery component is partially or fully disjoint from the initial carrier recovery component and the phase rotation and detection component.

16. The method of claim 15, further comprising providing an estimate of phase offsets in the received signal to the fine carrier recovery component.

17. The method of claim 12, further comprising operating on plural data inputs in parallel by one or both of the initial carrier recovery component and the phase rotation and detection component.

18. The method of claim 12, wherein the equalized output comprises a first number N of symbols in parallel, and wherein generating the carrier recovery output, performing the phase rotation, detecting the symbols, and feeding back the detected symbols comprise operating on all of the N symbols in parallel, and wherein the fine carrier recovery component is configured to operate on a second number M of the N symbols in parallel, wherein M is less than N.

19. The method of claim 12, wherein the equalized output comprises a first number N of symbols in parallel, and wherein generating the carrier recovery output, performing the phase rotation, detecting the symbols, and feeding back the detected symbols comprise operating on all of the N symbols in parallel, and the fine carrier recovery component operates serially on the N symbols.

\* \* \* \* \*